March 5, 1963 G. FONTANA ETAL 3,080,301
PROCESS FOR THE PRODUCTION OF ACRYLONITRILE
HAVING A HIGH DEGREE OF PURITY
Filed Feb. 8, 1960
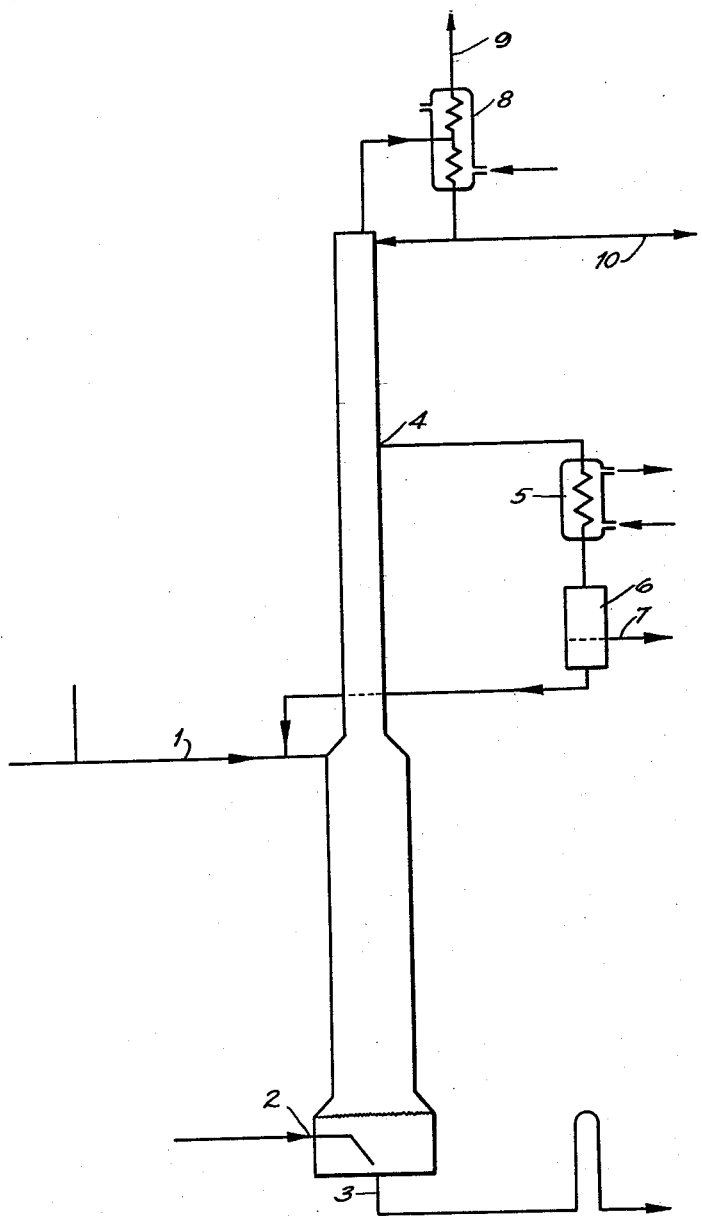
INVENTORS
GIUSEPPE FONTANA
GIUSEPPE FEDERICI
BY Toulmin & Toulmin
ATTORNEYS

United States Patent Office 3,080,301
Patented Mar. 5, 1963

3,080,301
PROCESS FOR THE PRODUCTION OF ACRYLONITRILE HAVING A HIGH DEGREE OF PURITY
Giuseppe Fontana and Giuseppe Federici, Milan, Italy, assignors to Sicedison S.p.A., Milan, Italy
Filed Feb. 8, 1960, Ser. No. 7,186
Claims priority, application Italy Feb. 14, 1959
5 Claims. (Cl. 202—42)

The present invention relates to the production of very pure acrylonitrile which may be especially suitable for the manufacture of textile fibres. Such a process comprises as a substantial feature a new type of distillation, which will be hereinafter designated as an azeotropic extractive distillation.

More particularly this invention relates to the purification of an aqueous solution of acrylonitrile achieved through the absorption of acrylonitrile in water, said acrylonitrile being produced in a reactor by reacting acetylene with hydrocyanic acid on cuprous salts as catalysts. Generally speaking these nitrile water solution besides, containing a certain amount of acrylonitrile of from 5 to 30 grams a liter, are mixed with many other impurities such as methylvinylketone, divinylacetylene, cyanobutadiene, lactonitrile, monovinylacetylene, chloroprene and polymers thereof.

It is well known to those who are skilled in the art that acrylonitrile may be obtained by making hydrocyanic acid react with acetylene at a temperature of about $+80°$ C. in the presence of a catalyst composed of cuprous chloride, potassium chloride and tiny quantities of sodium chloride, causing then the acrylonitrile enriched vapours coming from catalyst to be absorbed in water.

Usually acrylonitrile is separated from nitrile water solution by means of steam stripping. In this manner a crude product is obtained which still contains all the impurities mentioned supra. Through successive distillations which require at least three and sometimes four diverse fractionating columns, the commercial product will be obtained from the crude one.

Such a commercial product is fit to produce by polymerisation, special types of textile fibres having a high merisation, special types of textile fibres having a high degree of purity. Particularly, whereas some of the impurities contained in nitrile water solutions such as lactonitrile, acetaldehyde, chloroprene and monovinylacetylene may be brought to tolerable values, even though expensively in the conventional processes referred to above, other impurities especially methylvinylketone, divinylacetylene and cyanobutadiene are present in the final product in percentages which cannot be permitted in the applications of acrylonitrile for special fibres having a high degree of quality. For instance, through the conventional procedures it is not possible to decrease the methylvinylketone contents below 500 parts in a million whereas the tolerated limit is at the best 100 parts in a million.

There has been research to remove such impurities by means of chemical processes, reacting them with special substances. Generally these processes have the inconvenience of introducing in acrylonitrile traces of other impurities, and diminishing the acrylonitrile output owing to inavoidable losses brought about by removing the purification agent.

The object of this invention is to produce from water solutions obtained through a usual process of synthesis of acrylonitrile from acetylene and hydrocyanic acid, an acrylonitrile in which are not present impurities of such a quality and quantity as to jeopardize the use of acrylonitrile for the production of synthetic fibres.

A further object of this invention is to provide acrylonitrile of a special purity, starting from nitrile water solutions by a special type of azeotropic and extractive distillation which hereinafter will be designated as "AZEX distillation."

A further object of this invention is to reduce the impurities contained in acrylonitrile, and especially the methylvinylketone, divinylacetylene and cyanobutadiene to allowable values for the utilisation of the monomer in polymerisation process to obtain textile fibres of a high degree of purity.

Further objects will be better understood from the following description.

It is known to those who are skilled in the art that the purification of acrylonitrile (hereinafter designated shortly as ACN) from methylvinylketone (hereinafter called K), from divinylacetylene (hereinafter called DVA) and from other impurities by simple distillation is made difficult owing to the fact that the respective boiling points are contained in a very narrow range. According to the literature data the boiling points are, say, of 78° C. for ACN and 79°–80° C. for K.

It has been thought of increasing the distillation temperature range bringing it to above 5.8° C. so as to make possible, under better conditions, the separation of said substances. This may be achieved either by adding to anhydrous acrylonitrile the amount of water needed for producing the two azeotropes $ACN.H_2O$, $K.H_2O$, or carrying out an azeotropic distillation directly on a nitrile water, i.e. on a ACN having a large excess of $H_2O$.

It is known to those skilled in the art that the boiling point of azeotrope ACN-water at the atmospheric pressure is nearly 70° C., whereas that of azeotrope K-water is of 75.8° C.

By means of a very efficient fractionating column it would then be theoretically possible to separate by distillation the azeotrope ACN-water from azeotrope K-water. Such a separation will be however very difficult to realize, and furthermore this kind of separation does not allow the desired outcome to be achieved because of the other impurities, especially cyanobutadiene and divinylacetylene being carried along.

Now, according to this invention, it has been found that in the case of azeotropic distillation of $ACN-H_2O$, for the purpose of separating the latter from other impurities (such as K, DVA, cyanobutadiene) and their azeotropes with $H_2O$, in the presence of hydrocyanic acid, the volatility of azeotrope $ACN-H_2O$ (in comparison with azeotrope $K-H_2O$) increases and the separation of the two azeotropes will be possible. By this means it will be easy to obtain a sharp separation, in an efficient fractionating column, of azeotrope $ACN-H_2O$ from the other azeotrope produced by water with the impurities which are required to be removed. Therefore, by distilling nitrile water in the presence of hydrocyanic acid it has been possible to obtain, in distillate, acrylonitrile of a high degree of purity, whereas the impurities (especially K and cyanobutadiene) remain in the distillation residue dissolved in water and are discarded.

The only FIGURE shown in the appended drawing represents very diagrammatically, the sketch of the plant.

By reference to the scheme shown on the accompanying drawing it will be apparent that the distillation takes place as follows:

The aqueous acrylonitrile solution, in which the aforementioned impurities are contained and some hydrocyanic acid is dissolved, is fed in conduit 1 at a temperature of 70° C. At the column base, at the spot 2, steam is directly injected, whereas at the lower point 3 the discharge water containing the impurities required to be removed, is withdrawn. Vapours driven off from column at point 4 condense in 5 and are collected in settler 6 where they separate into two layers, the aqueous layer containing dissolved ACN, recycled to conduit 1 to mix with aqueous solution, which is being fed, whereas the other layer constituted by pure ACN and 3+5% water, by weight, is taken away at point 7. At point 8 the vapours coming from the column head are partially condensed in a H₂O refrigerating plant from which the low boiling fractions are separated by bleeding them through the conduit 9, whilst the condensed liquid is refluxed to the column, with the possibility too of being taken away at 10 for analytical purpose.

The operating conditions for realizing the distillation are set forth in the section (B) of the following example.

In order to better illustrate the results obtained by the distillation process herein disclosed, an example is given divided into two parts: the first one (A) sets forth the data obtained by distilling water containing ACN and the other impurities, while the second one (B) gives the results obtained by distilling the same water (with ACN and the other impurities) after addition of a predetermined amount of HCN. This example must be understood as having been given by way of illustration and not as restricting the full scope of the present invention.

*Example*

(A) 10,000 grams of water containing nitrile obtained by reacting hydrocyanic acid with acetylene and subsequent absorption in H₂O of the reaction products, having the following composition:

| | | |
|---|---|---|
| Acrylonitrile | g./l | 20 |
| Methylvinylketone | p.p.m | 98 |
| Lactonitrile | g./l | 4 |
| Hydrocyanic acid | g./l | 0.01 |
| Acetic aldehyde | g./l | 0.02 |
| Cyanobutadiene | g./l | 0.2 |
| Divinylacetylene | p.p.m | 33 | are distilled in a distillation column made up of two sections; the lower one being 4 cm. in diameter and having a separation efficiency equivalent to 16 theoretical bubble plates; and the upper one being 2.5 cm. in diameter and having a separation efficiency equivalent to 30 theoretical bubble plates. Feeding (at the top of a lower section) at the temperature of 70° C. is as much as 1000 g./hr. and the vaporous product stream drawn off is carried out at the 10th plate of the upper section at vapour stage. The condensing vapours separate themselves into two layers, the upper oily one constituted by acrylonitrile and about 4% by weight of H₂O, and the lower one made up mostly of H₂O saturated with ACN which will be led back to the column after being mixed with the feeding nitrilic H₂O.

By using a reflux ratio of 1:5 there are brought about the following results:

(1) Oil layer distilled at 70° C. (corresponding to point 7 of the accompanying drawing).

| | | |
|---|---|---|
| Acrylonitrile | g | 167 |
| Water | g | 6.7 |
| Methylvinylketone | p.p.m | 500 |
| Hydrocyanic acid | p.p.m | 10 |
| Acetaldehyde | p.p.m | 15 |
| Cyanobutadiene | p.p.m | 180 |
| Divinylacetylene | p.p.m | 350 |

(2) Aqueous layer (13% of distillated azeotrope)—All recycled.

(3) Heads or portions bled at the top of the cooling apparatus (keeping the reflux at the base of the cooling apparatus at 69.5° C.).

| | Grams |
|---|---|
| Acrylonitrile | 23 |
| Water | 2 |
| Methylvinylketone | 0.1 |
| Hydrocyanic acid | 0.1 |
| Acetaldehyde | 0.2 |
| Cyanobutadiene | 0 |
| Divinylacetylene | 0.12 |

(4) Bottom discharge

| | Grams |
|---|---|
| Acrylonitrile | 2 |
| Lactonitrile | 38–40 |
| Divinylacetylene | 0.14 |
| Cyanobutadiene | 2 |

Residue virtually water which contains the remaining portion of methylvinylketone.

(B) 10,000 grams of water containing nitrile obtained by reacting hydrocyanic acid with acetylene and successive absorption in H₂O of the reaction products having a composition like that said in section (A) but for the HCN contents, i.e.:

| | | |
|---|---|---|
| Acrylonitrile | g./l | 20 |
| Methylvinylketone | p.p.m | 103 |
| Lactonitrile | g./l | 4 |
| Hydrocyanic acid | g./l | 2 |
| Acetaldehyde | g./l | 0.2 |
| Cyanobutadiene | g./l | 0.2 |
| Divinylacetylene | p.p.m | 30 | are being distilled in the same column and in the like conditions disclosed at (A) being fed as much as 1000 g./h. at 70° C., and a reflux ratio of 1/5: the outcome is as follows:

(1) Oily layer distilled at 69° C.

| | | |
|---|---|---|
| Acrylonitrile | g | 180 |
| Water | g | 7.5 |
| Hydrocyanic acid | g | 4 |
| Methylvinylketone | p.p.m | 90 |
| Acetaldehyde | g | 0.1 |
| Cyanobutadiene | p.p.m | 8 |
| Divinylacetylene | p.p.m | 30 |

(2) Aqueous layer (8% of the distilled azeotrope)—All recycled.

(3) Heads or portions bled at the top of the cooling apparatus (keeping the reflux at the cooling apparatus base at 65° C.).

| | g. |
|---|---|
| Acrylonitrile | 12 |
| Hydrocyanic acid | 16 |
| Acetaldehyde | 1.9 |
| Water | 0.2 |
| Divinylacetylene | 0.14 |

(4) Bottom discharge

| | g. |
|---|---|
| Acrylonitrile | 4 |
| Lactonitrile | 38–40 |
| Divinylacetylene | 0.15 |
| Cyanobutadiene | 2 |

The residue is virtually water which contains the remaining portion of methylvinylketone.

As becomes apparent from the preceding description and from the numerical example, the main advantage of the procedure, being the object of this invention, consists in the possibility of achieving by simple means an acrylonitrile with a high degree of purity.

Other advantages, moreover, result from this procedure which make possible a greater efficiency and an easier operation of the system. They become apparent to those skilled in the art, from the following considerations:

(a) According to the process usually employed, the crude acrylonitrile (obtained through stripping a nitrile water) after a first distillation for removing the low-boiling fractions, is distilled again in a column (hereinafter called A) to remove from ACN the high-boiling fractions. The distillation column which drives off the high-boiling fractions (A) discharges from the bottom a product particularly enriched in cyanobutadiene, lactonitrile and methylvinylketone. The bottom mixture of column A, which corresponds, with regard to the quantity, to about 20% of the crude to be distilled, is reworked by means of conventional systems in an adapted distillation column (B) from which a portion of the crude product (head) (C) is recycled adding itself to the crude acrylonitrile whereas the residue (tails) (D) is being led to waste.

The recycling of C implies a quality degradation of the cycle itself, inasmuch as these high-boiling fractions cannot be well separated by means of only one column; to remove this contamination there have been tested some chemical treatments for purification which imply a more elaborated system and a decrease of the efficiencies. The tails D led to waste do still contain fair percentages of acrylonitrile, which is thus lost.

By employing the system of the present invention, said shortcomings are prevented inasmuch as the high-boiling fractions are directly discarded together with the discharge water at the base of the column.

(b) The excess hydrocyanic acid required by distillation according to the invention or the HCN excess already used in the conventional system and directly fed to reaction, need not be recovered by means of expensive processes relevant to both the plant and the operation, or bled with loss of efficiency, but may be directly led again to reaction.

From what has been previously said, it comes about that the hydrocyanic acid contained in these bleedings is being utilized again in the reactor for producing further acrylonitrile, whereas the acrylonitrile also contained in the bleedings is recycled and therefore is not lost. Furthermore the recycled acetaldehyde too is utilized for producing lactonitrile. Now, if the minor reactions which bring about the production of lactonitrile, that is to say:

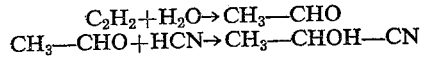

$$C_2H_2 + H_2O \rightarrow CH_3-CHO$$
$$CH_3-CHO + HCN \rightarrow CH_3-CHOH-CN$$

are taken into account, it may be inferred that owing to reaction balancing the introduction of acetaldehyde makes this set of reactions retrocede with a lower consumption of acetylene, and a greater utilisation of the latter for the production of acrylonitrile. Thus, it has been discovered that by utilizing this invention to obtain acrylonitrile products having a high degree of purity, that there is also obtained an increased yield with respect to the conversion of acetylene to acrylonitrile.

From the preceding description of this invention, the teachings therein can be utilized by a chemical engineer to accomplish the separation in a facile manner, by merely employing the economical operating conditions that are suitable for each case. Preferably, however, it is desirable to conduct the distillation so that the feed stream contains about 10–30 grams per liter of acrylonitrile; 5–1000 parts per million of methylvinylketone, cyanobutadiene and divinylacetylene; together with amounts of lactonitrile and acetaldehyde ranging from 0–10 grams per liter; with sufficient hydrocyanic acid to maintain a concentration greater than 0.4 gram per liter. Furthermore, it is preferred that the ratio of the reflux of the amount of mixture condensed at the column head to the amount drawn off in the vapor phase has a value from 1–20.

It will be understood that the invention is susceptible to modification in order to adapt it to different usages and conditions and, accordingly, it is desired to comprehend such modifications within the invention as may fall within the scope of the appended claims.

What we claim is:

1. A continuous distillation process for the separation of acrylonitrile from methylvinylketone impurities, which process comprises azeotropically distilling in a distillation zone a crude aqueous solution containing about 10 to 30 grams per liter of acrylonitrile, 5–1000 parts per million of methylvinylketone, and at least 0.4 gram per liter of hydrocyanic acid; withdrawing an azeotropic mixture comprising water and acrylonitrile from said distillation zone; condensing said azeotropic mixture, and separating said mixture into a water phase, and an acrylonitrile product phase containing less than 100 parts per million of methylvinylketone.

2. The process of claim 1, wherein the separated water phase from the azeotropic mixture is recycled to the hydrocyanic acid containing crude feed, and reintroduced into said distillation column.

3. The process of claim 1, wherein the feed is introduced at the center portion of the distillation zone, and the azeotropic mixture is withdrawn from the distillation zone at a point above the feed.

4. The process of claim 3, wherein the azeotropic mixture is withdrawn at a point above the feed, but below the top of the distillation zone, and wherein an overhead product is collected from the top of said zone, partially is condensed, and the condensate is refluxed to the top of the zone.

5. The process of claim 3, wherein the crude dilute aqueous acrylonitrile is obtained by reacting acetylene with hydrocyanic acid in a reactor, and subsequently absorbing the gaseous reaction products in water; and wherein the overhead product from the distillation zone comprises hydrocyanic acid and acetylene; and further comprising the step of recycling said overhead product to the reactor for the further production of acrylonitrile.

References Cited in the file of this patent

UNITED STATES PATENTS

| | | |
|---|---|---|
| 2,773,088 | Maslan | Dec. 4, 1956 |
| 2,798,035 | Derbenwick et al. | July 2, 1957 |
| 2,807,573 | Robertson | Sept. 24, 1957 |
| 2,836,614 | Bewley | May 27, 1958 |
| 2,878,166 | Dunn | Mar. 17, 1959 |